April 1, 1969

R. C. GULARTE ET AL 3,435,919

ENERGY ABSORBING ARRANGEMENT

Filed April 3, 1967

INVENTORS
RONALD C. GULARTE
DAVID L. PLATUS
BY
ATTORNEY

INVENTORS
RONALD C. GULARTE
DAVID L. PLATUS
BY
Don Finkelstein
ATTORNEY

United States Patent Office 3,435,919
Patented Apr. 1, 1969

3,435,919
ENERGY ABSORBING ARRANGEMENT
Ronald C. Gularte, Los Angeles, and David L. Platus, Covina, Calif., assignors to Mechanics Research, Inc., a corporation of California
Filed Apr. 3, 1967, Ser. No. 628,000
Int. Cl. F16d 63/00; B62d 1/16
U.S. Cl. 188—1                                    11 Claims

ABSTRACT OF THE DISCLOSURE

There is disclosed herein an energy absorbing arrangement in which a flexible toroidal-like, energy absorbing member is confined in the annular space between an inner, cylindrical body member and an outer tube-like body member. Relative motion between the inner body member and the outer body member roll the toroidal-like member in the annular space, and thereby absorbs energy in the rolling due to the cyclical plastic deformation or hysteretic deformation thereof, since the annular spacing between the inner body member and the outer body member is less than the unstressed and undeformed diameter of the flexible, toroidal-like member. A nondeformable rigid cylindrical retainer means may be positioned within the flexible, toroidal-like member to limit the radial deformation thereof to prevent stress relieving plastic flow or creep of the flexible toroidal-like energy absorbing member.

BACKGROUUND OF INVENTION

Field of invention

This invention relates to the energy absorbing art and more particularly to an improved energy absorbing arrangement capable of providing comparatively high energy absorbing rates with a comparatively high degree of design flexibility.

Description of the prior art

In many energy absorbing applications, it is desirable to absorb energy in a strut-like arrangement in which linear motion is produced and during such linear motion, the energy is to be absorbed. Such applications, of course, include, but are not limited to, collapsible steering columns in automobiles, seat mounting structures in various passenger carrying vehicles, landing struts of space vehicles, stree overload devices, and the like.

Crushable or fragmenting tubes, honeycomb or cylindrical shells and other similar "one-shot" devices, have generally not been capable of providing the total energy absorption or the energy absorption rate desired in convenient packing arrangements of sizes applicable to many of the above described applications. Springs, on the other hand, while capable of many size modifications are generally of an energy absorbing and returning nature and do not, in the strict sense, absorb an appreciable amount energy. Fluid transfer devices, such as hydraulic shock absorbers, extrudable metal devices and the like, generally do not have a high absorption rate per unit of weight or volume associated with the energy absorbing device.

Various cyclic plastic deformation energy absorbing devices, such as those employing rolling solid toroidal elements have comparatively high energy absorption characteristics per unit weight or volumne but in general such devices provide extremely limited design flexibility. That is, for a given energy absorption rate, the size and weight of such an energy absorbing arrangement is substantially fixed and in general requires comparatively high manufacturing tolerances. This, of course, results in comparatively complex manufacturing techniques and associated high manufacturing costs.

Consequently, there has long been a need for a comparatively light weight, high energy absorption rate arrangement that allows considerable design flexibility and yet is comparatively easy and low cost to fabricate.

SUMMARY OF THE INVENTION

Accordingly, it is the object of applicants' invention herein to provide improved energy absorbing arrangement.

It is another object of applicants' invention herein to provide an energy absorbing arrangement in which design flexibility is provided.

Yet another object of applicants' invention herein is to provide an energy absorbing arrangement that is comparatively easy to fabricate and comparatively low in cost.

The above and other objects are achieved, according to one embodiment of applicants' invention by providing energy absorption through the cyclic plastic deformation of a plurality of radially compressed toroidal-like members, that is, the toroidal-like members are compressed along a diameter thereof.

In this embodiment, there is provided a substantially cylindrical inner body member positioned within and substantially concentrically coaxially mounted within a cylindrical, tube-like outer body member. The inner wall of the outer body member is spaced a preselected distance from the outer wall of the inner body member.

A flexible, toroidal-like energy absorbing means is positioned between the inner member and the outer member in the annular volume defined thereby, and the flexible, toroidal like energy absorbing means has an unstressed radial dimension that is a preselected amount greater than the spacing between the outer wall of the inner body member and the inner wall of the outer body member. Thus, the flexible, toroidal-like energy absorbing member is radially dimensionally deformed to provide a deformed radial dimension that is less than the unstressed dimension and thereby there is provided a predetermined stress distribution around the energy absorbing means.

The flexibility of the energy absorbing means provides the toroidal configuration in which driving rolling motion thereof for relative axial motion between the inner body member and outer body member, substantially no energy absorption occurs to the cyclic tension-compression of the longitudinal fibers thereof but rather the comparatively much greater energy absorption capability is achieved by the cyclic bending in the plane of the cross-section, that is, in the circumferential direction of the toroidal-like member.

In one preferred embodiment of applicants' invention the flexible, toroidal-like member is in the form of a wire-like means wound in a helical shape with a predetermined lead and extending around the inner member in the annular volume between the inner volume members and the outer body member.

In other embodiments, the flexible, toroidal-like energy absorbing means may be in the form of a plurality of cylindrical tube-like members or ring-like members in a predetermined spaced array in the annular volume. In this embodiment of applicants' invention, a substantially incompressible, nondeformable annular retainer ring is positioned within the ring-like members to restrain them in their predetermined spacial relationship and to limit the radial deformation of the ring-like members to prevent stress relieving plastic flow thereof, which may occur, often, during nonuse of the device. That is, during periods when there is no relative motion between the inner body member and the outer body member, and thereby no rolling motion of the ring-like members, the ring-like members would have a tendency to undergo plastic flow tending to relieve the stress distribution originally put therein and take an undesirable set.

The friction forces between the energy absorbing means and the inner body member and the outer body member during relative motion between the inner drum member and the outer drum member provides the energy absorbing rolling motion of the energy absorbing means so that during such relative motion energy is thereby absorbed.

The above and other embodiments of applicants' invention may be more clearly understood from the following detailed description taken together with the accompanying drawing wherein similar reference characters refer to similar elements throughout.

DESCRIPTION OF THE PREFERRED EMBODIMENTS

Figure 1:
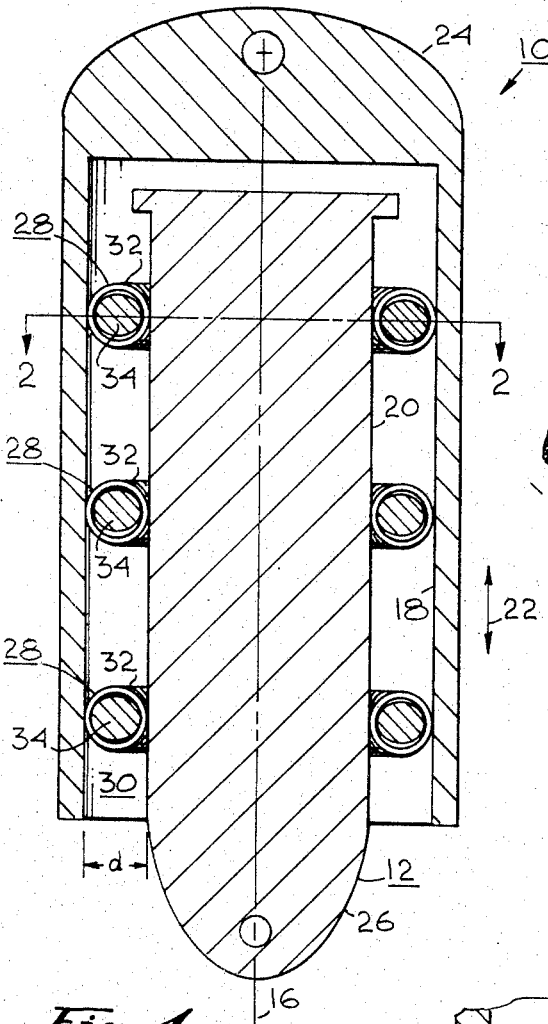
FIGURES 1, 2, 3 and 4 illustrate one embodiment of applicants' invention.

As noted above, applicants' improved energy absorbing arrangement absorbs energy by the cyclic deformation of the material exhibiting hysteretic stress-strain behavior. Such energy absorption may be by the cyclic plastic deformation of a ductile metal.

In one embodiment of applicants' invention, the ductile metal utilized as the energy absorbing medium is in the form of a flexible, tubular, toroidal-like energy absorbing means that is radially compressed. That is, the energy absorbing means that is compressed in the direction of its own radius, so that it is forced into a non-circular cross-sectional shape. The energy absorbing means is strained well beyond its yield point and the relative motion of the members providing the radial compression produces cyclic plastic bending deformation of the toroidal-like means, thereby generating a substantially constant resisting force. Applicants prefer tubular, toroidal-like members as a design configuration for the energy absorbing means in this embodiment, and variations in both diameter and wall thickness, as well as other parameters specific to the detailed design of the energy absorbing means allows a high degree of design flexibility for providing both high and low energy absorbing characteristics in small or large spaces, as may be required. Thus, in applications, such as landing struts, shock isolation, earthquake and blast resistant structures, collapsible steering wheels, mechanical fuse applications, and the like, the energy absorbing characteristics of the radially compressed rolling toroidal-like member provides the desired energy absorption for the application.

In the cyclic plastic strain of a ductile metal in a fixed strain range, there is produced a hysteresis loop which stabilizes during the first few cycles. The repeated cycling results in almost constant energy absorption per cycle until eventual fatigue failure. Since the plastic strain fatigue behavior of ductile metal generally follows a simple law relating plastic strain range, which may be considered the width of the hysteresis loop and the fatigue life, the design characteristic combining the type of metal utilized for the energy absorbing means and the diameter of the energy absorbing means, the wall thickness of the energy absorbing means, and the amount of radial compression imposed thereon, can provide variations in both the energy absorption characteristics as well as the length of life of the working energy absorbing means until failure.

That is, the narrower the hysteresis loop, which implies less energy absorption per cycle, the greater will be the cycles to failure. Consequently, the greater total energy absorption of the device, until failure of the working element.

In the embodiments of applicants' invention described below there is shown, in the preferred arrangement thereof, the utilization of a stiff, substantially incompressible and nondeformable annular retainer means positioned within the toroidal-like energy absorbing means and the thickness of the retainer means is selected so that the radial deformation of the energy absorbing means is carefully controlled to a predetermined value. Thus, the retainer ring prevents stress relieving plastic flow or "creep" of the energy absorbing means, during the static condition thereof, and therefore increases the storage life and active life of the energy absorbing means.

The various structural arrangements illustrated in the following embodiments of applicants' invention may be interchanged as required by design consideration. That is, the various configurations of the energy absorbing means and the various arrangements between the members providing the radial compression thereon may equally well be interchanged as desired to provide the desired energy absorption characteristics.

Figure 2:
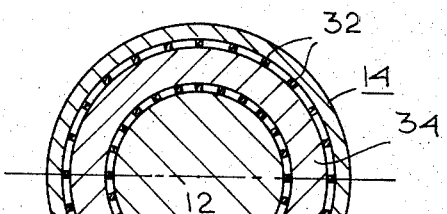
Figure 3:
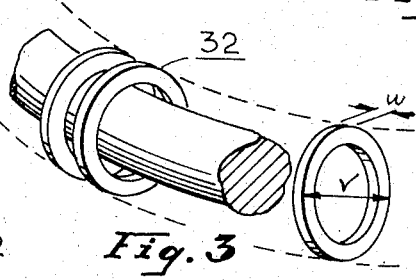

Turning now to FIGURES 1, 2 and 3, there is shown one embodiment of applicants' improved energy absorbing arrangement, generally designated at 10. The energy absorbing arrangement 10 is comprised of a generally cylindrical inner body member 12 which may be solid as shown, or, to reduce weight, may be tubular.

A tube-like outer body member 14 is concentrically mounted on the inner body member 12 and is coaxially aligned therewith along axis 16. The inner wall 18 of the tube-like outer member 14 is spaced a preselected distance, designated by the symbol $d$, from the outer wall 20 of the inner body member 12. The outer body member 14 and the inner body member 12 are adapted to have relative axial movement therebetween, in the directions indicated by the double-ended arrow 22. During such movement it is desired that energy be absorbed. For example, the outer member 14 is provided with a coupling end 24 that may be affixed, for example, to the frame of a motor vehicle such as a bus (not shown). The inner member 12 is provided with a coupling end 26 that may be coupled in this example to, for example, the seat structure (not shown) of the bus. If the bus were to be involved in an accident, it is desired that the seat structure not pull free of the frame but rather than energy be absorbed in any movement of the seat so that the occupant thereof is protected.

It will be appreciated, of course, that in this embodient of applicant's invention, as well as in the other embodiments of applicants' invention hereinafter described, the energy absorbing arrangement is double acting. This is, energy may be absorbed for relative movement of the, for example, inner member 12 towards or away from the coupling end 24 of the outer body member 14.

A tubular, flexible, toroidal-like energy absorbing means 28 is positioned within the annular volume 30 defined by the inner wall 18 of the outer body member 14 and the outer wall 20 of the inner body member 12, as provided by the spacing therebetween. In this embodiment of applicants' invention, the tubular, flexible, toroidal-like energy absorbing means 28 is comprised of a plurality of separate, ring members or cylindrical, tube-like segments 32. The arrangement of these tube-like segments is shown more particularly in FIGURES 2 and 3. The tube-like segments 32 have a comparatively short axial length, as indicated by the symbol $w$ on FIGURE 3, and a preselected wall thickness. The unstressed diameter of the cylindrical, tube-like segments 32 on the outside diameter thereof is greater than the distance $d$. That is, in the radial direction of each of the segments 32 (the radial direction is defined as in the direction of the diameter at the segment 32), the outside diameter thereof is greater than the dimension $d$. Therefore, each cylindrical, tube-like segment 32 is subjected to a predetermined amount of radially directed compression, when they are constrained between the inner body member 12 and the outer body member 14. This provides a predetermined stress distribution around each tube-like segment 32 and as noted above, each segment 22 is stressed beyond its yield point and in the preferred embodiment of applicants' invention, each segment 32 is fabricated from a ductile metal and these is produced therein cyclic plastic bending deformation thereof due to the rolling of the segments 32 between the inner body member 12 and outer body member 14 during relative motion therebetween in the directions indicated by the arrow 22.

In this embodiment of applicants' invention designated 10, the plurality of ring members or cylindrical, tube-like segments 32, are positioned in the annular space 30 to define together a substantially toroidal-like energy absorbing means 28. In order to maintain the individual tube-like segments 32 in the proper alignment, and to prevent "creep," as described below, applicants prefer to provide a substantially incompressible, nondeformable annular retainer ring member 34 positioned within the plurality of cylindrical, tube-like segments 32.

The retainer ring 34 not only provides the proper spacial array distribution of the tube-like segment 32 in the preferred configuration, but also maintains the spacing between adjacent rows of flexible energy of absorbing means 28, of which three are shown in FIGURE 1.

The flexibility desired in the preferred embodiment of applicants' invention for the energy absorbing means 28, insures that when the tube-like segments 32 are positioned in a toroidal-like array in the annular space 30, they are not "stiff walled," and thus they absorb energy by the cyclic plastic bending deformation thereof, rather than the comparatively small amount of tension-compression reversal in the longitudinal fibers of a stiff wall member, as heretofore utilized in many prior art energy absorbing applications.

Further, rolling tube energy absorbing elements heretofore proposed have been stiff walled and therefore generally cannot be confined within the annular space 30 to provide the energy absorbing arrangement desired.

Figure 4:
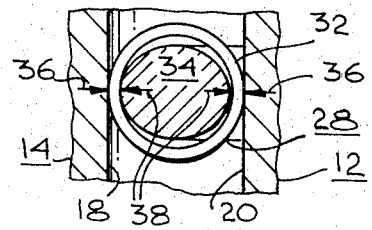

FIGURE 4 illustrates the forces associated with the deformation of the tube-like segment 32. The diametrically opposed forces, as indicated by the arrows 36, provided by the inner body member 12 and outer body member 14 provide the radial deformation of the tube-like segment 32, and, together with the coefficient of friction between the inner wall 18 of the outer body member 14 and the outer wall 20 of the inner body member 12, cause the tube-like segment 32 to roll during the relative axial movement of the inner body member 12 and outer body member 14.

However, it has been found that when the tube-like segments 32 are plastically deformed between the inner body 12 and outer body member 14, "creep" occurs. Creep is hereby defined to indicate that particular phenomenon in which there is an increase in strain in the member with little or no corresponding increase in stress. If creep were to occur, the plastically, radially deformed tube-like segments 32 would continue to deform, the force indicated by the arrows 36 would decrease and the tube-like segments 32 would no longer roll. To prevent this creep, applicants prefer to utilize in this, as well as in the other embodiments of applicants' invention hereinafter set forth, the rigid retainer ring 34. The size of the retainer ring 34 is selected so that a predetermined radial deformation of the tube-like segment 32 occurs and then the ring 34 opposes the forces indicated by the arrows 36 with matching forces indicated by the arrows 38. This prevents further deformation of the tube-like segment 32, maintains the forces indicated by the arrow 36, which are necessary to cause the tube-like segments 32 to roll, and thereby prevents stress relieving plastic flow of the tube-like segments 32.

It will be appreciated that the prevention of creep is a desired feature in the preferred embodiment of applicants' invention herein. That is, in addition to retaining the alignment and preselected spacial array of the tube-like segments 32 necessary for the embodiment shown in FIGURE 1, many of the embodiments hereinafter described may also utilize a rigid, nondeformable retainer ring to prevent the phenomenon known as creep.

For the arrangement shown in FIGURES 1 through 4, it will be appreciated that there is considerable design flexibility in the selection of the energy absorbing configuration. That is, for a given size of energy absorbing arrangement 10, the enery absorbing capacity may be varied by increasing or decreasing the number of individual cylindrical tube-like segments 32 within each flexible, toroidal-like energy absorbing means 28, as well as the number of such flexible toroidal energy absorbing means 28. Similarly, there is comparatively high energy absorption compared to the weight of the working elements since energy is absorbed in the cyclic plastic bending deformation of the tube-like segments 32.

In other embodiments of applicants' invention, the particular type of flexible, toroidal-like energy absorbing means may be selected to suit various design applications.

Figure 5:
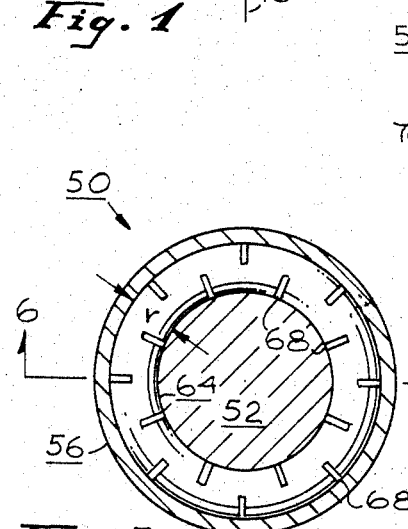
FIGURES 5 and 6 illustrate another embodiment of applicants' invention.
Figure 6:
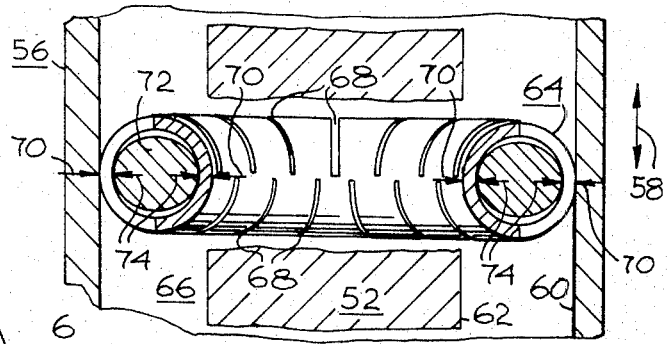

Such another embodiment of applicants' invention is illustrated in FIGURES 5 and 6. As shown thereon, there is an energy absorbing arrangement generally designated 50 according to applicants' invention herein. The energy absorbing arrangement 50 is comprised of a cylindrical inner body member 52 which, for example, may be similar to the inner body member 12 described above, concentrically mounted on a common axis 54 with a tube-like outer body member 56. The tube-like outer body member 56 may be similar, for example, to the outer body member 14 described above.

The outer body member 56 and inner body member 52 are adapted to move in axial directions relative to each other in the directions that are indicated by the arrow 58. The inner wall 60 of the outer body member 56 is spaced apart a preselected distance from the outer wall 62 of the inner body member 52 and a flexible, toroidal-like energy absorbing means 64 is positioned in the annular volume 66 defined by the inner wall 60 of the outer body member 56 and the outer wall 62 of the inner body member 52. In this embodiment of applicants' invention, the flexible toroidal-like energy absorbing means 64 is fabricated from a tube in which there are cut a plurality of circumferentially extending slots 68 that overlap each other in a preselected array. The slots 68 allow the flexibility of the tube to be formed into the toroidal shaped shown and be free of the rigid wall limitations on energy absorption. That is, the overlapping circumferentially positioned slots 68 allow this degree of flexibility in the means 64 so that it may be fabricated into a toroidal shape to be positioned within the annular volume 66.

The radial dimension of the toroidal energy absorbing means 64, as indicated by the symbol $r$ on FIGURE 5, which is the outside diameter of the tube defining the flexible, toroidal shaped energy absorbing means 64 is, in the unstressed condition, slightly greater than the preselected distance between the outer wall 62 of the inner body member 52 in the inner wall 60 of the outer body member 56. Therefore, when the flexible toroidal shaped energy absorbing means 64 is positioned between the inner member 52 and outer member 56, it is deformed and strained well beyond its yield point by the forces indicated by the arrows 70. During relative axial movement in the directions indicated by the arrow 58 of the inner body member 52 and outer body member 56, the flexible, toroidal-like energy absorbing menas 64 is rolled and there is cyclic plastic bending deformation thereof to absorb energy during such relative motion.

In order to prevent the phenomenon described above and termed "creep," it is desired, in a preferred embodiment of the energy absorbing arrangement 50 shown in FIGURES 5 and 6, to provide a substantially incompressible, nondeformable annular retainer ring 72 within the toroidal-like means 64. The thickness of the retainer ring, 72, which may be similar to the retainer ring 34 described above, is predetermined to allow a preselected radial deformation of the tube defining the flexible, toroidal-like energy absorbing means 64 and provide resisting forces 74 to the forces on the energy absorbing means 64 as indicated by the arrows 70, and these resisting forces are indicated by the arrows 74 in opposition to the forces indicated by the arrows 70. As described above, this prevents further stress relieving deformation of the energy absorbing means 64 and maintains the force indicated by the arrows 70 thereon necessary to provide rolling motion of the tube during the relative motion of the inner member 52 and outer member 56. It will be appreciated that variations in the wall thickness of the tube forming the flexible toroidal-like energy absorbing means 64 as well as the radial dimension $r$ thereof may be selected as desired to provide design flexibility in diverse applications.

Figure 7:
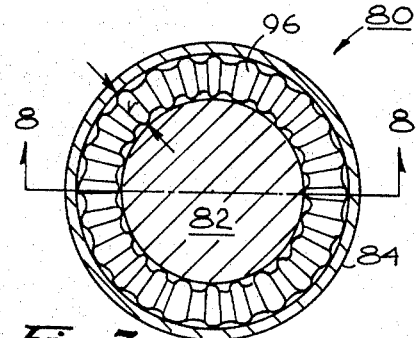
FIGURES 7 and 8 illustrate another embodiment of applicants' invention.
Figure 8:
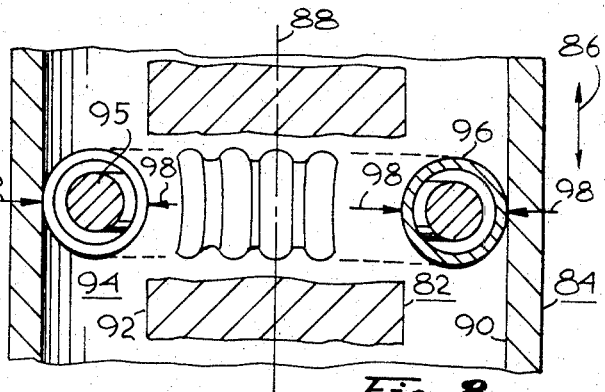

In another embodiment of applicants' invention as indicated in FIGURES 7 and 8, and generally designated 80, the structure may be similar to the structure shown for the embodiments of applicants' invention described above and may comprise an outer body member 84 which are adapted to provide relative motion in axial directions as indicated by the arrow 86 therebetween. The inner body member 82 and outer body member 84 may be similar to the inner body member 12 and outer body member 14 described above, respectively, and are coaxially aligned with axis 88.

The inner wall 90 of the outer body member 84 is spaced a preselected distance from the outer wall 92 of the inner body 82 to define an annular volume 94 therebetween. A flexible energy absorbing means 96 is positioned within the annular volume 94 between the outer member 84 and the inner member 82. In this embodiment of applicants' invention, the flexible toroidal-like energy absorbing means is in the form of a bellows tube, such as the 300 series stainless steel bellows tube manufactured by Master Products Manufacturing Company, 3481 E. 14th St., Los Angeles, Calif. The bellows tube 96 is formed into the shape of a toroid for positioning around the inner body member 82, and is compressed in radial directions thereof by the forces indicated by the arrows 98. The large radial dimension of the bellows tube 96, as indicated by the symbol $r$ on FIGURE 7, is the outer diameter of the large portions of the bellows tube and, in the unstressed condition, the outside diameter indicated by the letter $r$ is greater than the spacing between the outer wall 92 of the inner body member 82 in the inner wall 90 of the outer body member 84. Therefore, the forces indicated by the arrows 98 compress the bellows tube 96 to provide a deformation thereof in the radial direction to strain at least the larger diameter sections of the bellows tube 96 beyond its yield point. Therefore, the forces indicated by the arrows 98, together with the frictional forces, roll the bellows tube 98 during the relative motion between the outer body member 84 and inner body member 82 in the directions indicated by the arrow 86 to provide cyclic plastic bending deformation of the bellows tube 96 and thereby absorb energy during such relative motion.

The flexibility of the bellows tube 96 is provided by the particular bellows-type construction to allow fabrication thereof in the toroidal shape shown. Creep prevention may be achieved in this embodiment also by providing a nondeformable incompressible annular retainer ring 85 positioned within bellows tube 96.

In the preferred embodiment of applicants' invention, both the bellows tube 96 and the slotted tube 64, shown in FIGURES 5 and 6, are fabricated from a ductile metal exhibiting hysteretic stress-strain behavior.

Figure 9:
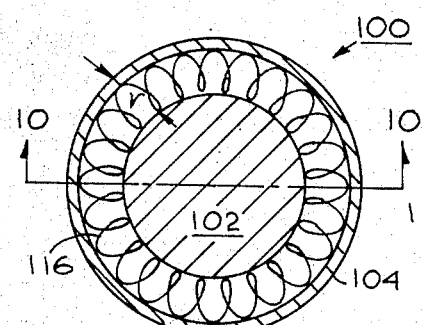
FIGURES 9 and 10 illustrate another embodiment of applicants' invention.
Figure 10:
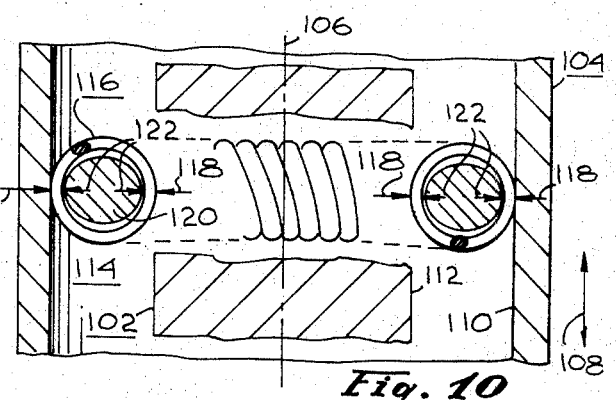

Energy may be absorbed by the cyclic deformation of a flexible toroidal-like energy absorbing means exhibiting hysteretic stress-strain behavior in yet another embodiment of applicants' invention shown in FIGURES 9 and 10 and generally designated 100. As shown thereon, there is an inner body member 102 coaxially aligned with and mounted within an outer body member 104 and having a common axis 106. The outer body member 104 and inner body member 102 may be similar to the outer body member 14 and inner body member 12 described above and are adapted to provide relative motion in axial directions therebetween as indicated by the arrow 108. The inner wall 110 of the outer body member 104 is spaced a preselected distance from the outer wall 112 of the inner body member 102 to define an annular volume 114 therebetween.

Positioned within the annular volume 114 is a flexible, toroidal-like energy absorbing means 116 that, in this embodiment of applicants' invention, is in the form of a wire-like means formed into a helix with a predetermined lead and extending around the inner body member 102 to define the toroidial-like shape. That is, the flexible toroidal-like energy absorbing means 116 is like a spring that is wound around the inner body member 102.

The outer diameter of the helix coils as indicated by the letter $r$ in the radial direction thereof, as shown in FIGURE 9, is greater than the preselected spacing between the outer wall 112 of the inner body member 102 and the inner wall 110 of the outer body member 104 so that there is provided forces, as indicated by the arrows 118, that radially deform the helical energy absorbing means 116 to strain the wire defining the helix beyond its yield point. The forces indicated by the arrows 118 together with the coefficient of friction provide rolling motion of the helical energy absorbing means 116 during relative axial motion of the inner body member 102 and outer body member 104.

As noted above, applicants prefer to avoid the phenomenon known as creep by providing a substantially incompressible, nondeformable annular retainer ring 120 positioned within the helix and having a predetermined diameter. The diameter of the retrainer ring is, as noted above, selected so that the helical energy absorbing means 116 will be radially deformed a predetermined amount and further deformation thereof will be prevented by establishing the resistant forces indicated by the arrows 122. This maintains the force necessary to provide the rolling motion of the helix during the relative axial movement of the inner body member 102 and outer body member 104, and prevents the stress relieving plastic flow thereof.

In the embodiment of applicants' invention, it can be seen that there was provided energy absorbing arrangements in which energy is absorbed during linear strokes of the energy absorbing device. That is, each of the inner body members and outer body members may be provided with coupling ends so that relative axial motion, during which energy is to be absorbed may occur by affixing each at the inner and outer body members to desired structure. However, applicants' invention is not limited to linear energy absorbing structures but rather, may equally well be adapted to rotary energy absorbing structures.

Figure 12:
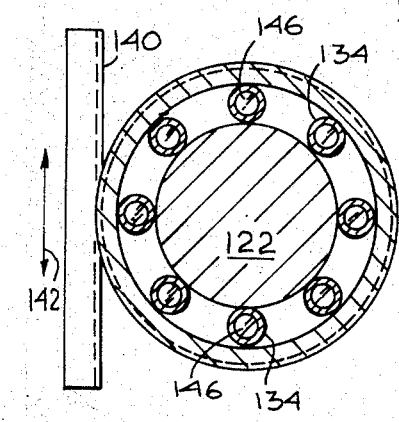
FIGURES 11 and 12 illustrate another embodiment of applicants' invention.
Figure 11:
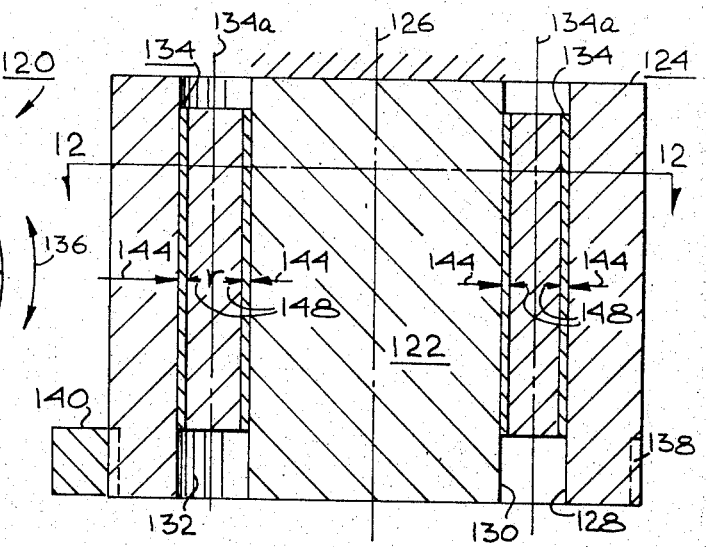

FIGURES 11 and 12 illustrate one embodiment of the rotary energy absorbing arrangement, generally designated 120 according to the principles of applicants' invention herein.

As shown in FIGURES 11 and 12, there is provided a cylindrical inner body member 122 coaxially aligned with and mounted within an outer tube-like body member 124. In the embodiment shown on FIGURES 11 and 12 the inner body member 122 may be considered fixed and the outer body member 124 may be adapted to rotate about their common axis 126 and during such relative rotation of the outer body member with respect to the inner body member 122, energy is to be absorbed.

The inner wall 128 of the outer body member 124 spaced a preselected distance from the outer wall 130 of the inner body member 122 to define an annular volume 132 therebetween.

A plurality of ductile metal tube members 134 are positioned within the annular volume 132 and have their respective axes 134a, substantially parallel to the axis 126. The unstressed radial dimension of the tube members 134, in the direction as indicated by the symbol "5" on FIGURE 11, is greater than the preselected spacing between the outer wall 130 of the inner body member 122 and the inner wall 128 of the outer body member 124. Therefore, the plurality of tube members 134, are strained beyond their yield point due to the radial compression thereof and during rotary motion of the outer body member 124 with respect to the inner body member 122, as indicated by the arrow 136, the tube members 134 are rolled and undergo cyclic plastic bending deformation to absorb energy. The outer body member 124 may, if desired, be provided with a toothed portion 138 to provide a gear for engaging a rack means 140. The rack means 140 is adapted to move in directions indicated by the arrow 142 and thus rotate the outer body member 124 in directions indicated by the arrow 136. The rack means 140 may be connected to any structure (not shown) desired and from which it is desired to absorb energy during motion thereof.

The compressive forces acting in the radial direction of the tube members 134 as indicated by the arrows 144 together with the friction forces roll the tube members 134 during such rotary motion. However, in a preferred embodiment of applicants' invention it is desired to avoid the phenomenon known as creep, as described above, and applicants, therefore, prefer to provide the rod-like substantially incompressible, nondeformable retainers 146 in each tube member 134 to provide the resistive forces indicated by the arrows 148 and thereby limit the radial deformation of the tube members 134 and prevent stress relieving plastic flow thereof.

It will be appreciated, of course, that the tube members 134 utilized as the energy absorbing means in FIGURES 11 and 12, could equally well be replaced by the helix energy absorbing means 116, the bellows tube energy absorbing means 96, the slotted tube energy absorbing means 64, or the plurality of cylindrical tube-like segments 32 all described above, to be utilized in a rotary energy absorbing arrangement such as shown in FIGURES 11 and 12.

From the above description, it is apparent that applicants provided an improved energy absorbing arrangement. In some embodiments a ductile metal is formed into a flexible toroidal like energy absorbing means and is cyclically strained in a plastic deformation during linear motion of the members to which it is drivingly coupled. In other embodiments of applicants' invention, the energy absorbing means may be in the form of cylindrical tube-like members that are cyclically strained in a plastic deformation region during relative rotary action of the members to which it is drivingly coupled. All the structures are double acting that is, act in either of two opposite directions to absorb energy for relative motion in such two opposite directions. Further, the comparatively large number of substantially independently variable criteria such as unstressed radial dimension, wall thickness, amount of deformation, fatigue-life, and the like, absorbing characteristics but also insure that the structure is comparatively easy to fabricate in that close tolerances need not be maintained and also may be fabricated from comparatively low cost items.

What is claimed as new and desired to be secured by Letters Patent of the United States is:

1. An energy absorbing device comprising, in combination:
a cylindrical inner body member;
a tube-like outer body member concentrically mounted on and surrounding at least a part of said cylindrical inner member and spaced a first preselected distance therefrom and defining an annular volume therebetween, and said tube-like outer body member and said cylindrical inner body member for relative axial motion therebetween;
a tube-like flexible, toroidal-like energy absorbing means positioned between said inner body member and said outer body member in said annular volume and having an unstressed radial dimension greater than said first preselected distance and said flexible, energy absorbing means is radially dimensionally deformed to a predetermined deformed dimension less than said unstressed dimension to provide a predetermined stress distribution therearound, for energy absorbing rolling motion between said inner member and said outer member for the condition of said relative axial motion therebetween.

2. The arrangement defined in claim 1 wherein:
said flexible, toroidal-like energy absorbing means is a ductile metal and said rolling motion thereof provides cyclic plastic bending deformation to absorb energy during said relative axial motion between said inner body member and said outer body member.

3. The arrangement in claim 2 and further comprising:
a substantially incompressible, nondeformable, annular retainer ring member positioned within said flexible, toroidal-like energy absorbing means and having a predetermined thickness thereof for limiting the radial deformation of said energy absorbing member to prevent stress relieving plastic flow thereof.

4. The arrangement defined in claim 3 wherein:
said energy absorbing member comprises a plurality of ring-like, cylindrical tube-like segments in a predetermined space array in said annular volume and each of said ring-like cylindrical tube-like segments having a predetermined width.

5. The arrangement defined in claim 2 wherein:
said flexible, toroidal-like energy absorbing means is a solid wire-like helical member extending in said volume around said cylindrical inner body member having a predetermined lead, and said radial dimension thereof is the helix diameter.

6. The arrangement defined in claim 5 and further comprising:
a substantially incompressible, nondeformable annular retainer ring member positioned within said helix and having a predetermined thickness, for limiting the radial deformation of said energy-absorbing member to prevent stress relieving plastic flow thereof.

7. The arrangement defined in claim 2 wherein:
said flexible, toroidal-like energy absorbing means comprises a tube-like member having a plurality of spaced apart circumferentially disposed slits thereon, in a preselected array and each of said plurality of slits extending partially around the tube circumference and having a predetermined width along the toroidal circumference.

8. Arrangement defined in claim 7 and further comprising
a substantially incompressible, nondeformable annular retainer ring member positioned within said tube-like member and having a predetermined thickness, for limiting the radial deformation of said tube-like member to prevent stress relieving plastic flow thereof.

9. Arrangement defined in claim 1 wherein:
said flexible-toroidal like energy absorbing means comprises a flexible bellows-tube member extending around said inner member in said annular volume.

10. Arrangement defined in claim 9 and further comprising:
a substantially incompressible, nondeformable annular retainer ring member positioned within said flexible bellows tube and having a predetermined thickness, for limiting the radial deformation of said bellows tube to prevent stress relieving plastic flow thereof.

11. An energy absorbing arrangement comprising, in combination:
   a first rigid body member and a second rigid body member spaced a preselected distance therefrom for relative motion therebetween;
   a tube-like deformable energy absorbing means positioned between said first and said second rigid body members having an unstressed outside diameter greater than said preselected distance, and a preselected inside diameter, and deformed in radial directions by said first and said second body members, for energy absorbing rolling motion therebetween for said relative motion between said first and said second rigid body member;
   and a cylindrical, rigid nondeformable retainer means positioned within said tube-like energy absorbing means and having a diameter less than said preselected inside diameter of said tube-like energy absorbing means, for limiting the radial deformation of said tube-like energy absorbing means to prevent stress relieving plastic flow thereof.

References Cited

UNITED STATES PATENTS 3,231,049    1/1966    Platus et al.
3,369,634    2/1968    Mazelsky.

DUANE A. REGER, *Primary Examiner.*

U.S. Cl. X.R.

74—492